US010972997B2

(12) United States Patent
Luecke

(10) Patent No.: US 10,972,997 B2
(45) Date of Patent: Apr. 6, 2021

(54) HYBRID TIME DIVISION MULTIPLE ACCESS (TDMA) AND CARRIER SENSE MULTIPLE ACCESS (CSMA) FOR INTERFERENCE AVOIDANCE METHOD THEREFOR

(71) Applicant: BENCHMARK ELECTRONICS, INC., Scottsdale, AZ (US)

(72) Inventor: Jim Luecke, Scottsdale, AZ (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 0 days.

(21) Appl. No.: 16/229,463

(22) Filed: Dec. 21, 2018

(65) Prior Publication Data

US 2019/0132878 A1 May 2, 2019

Related U.S. Application Data

(60) Provisional application No. 62/577,566, filed on Oct. 26, 2017.

(51) Int. Cl.
*H04W 64/00* (2009.01)
*H04W 74/08* (2009.01)
*H04W 74/02* (2009.01)
*H04W 8/00* (2009.01)
*H04W 88/18* (2009.01)
(Continued)

(52) U.S. Cl.
CPC ............ *H04W 64/003* (2013.01); *G01S 5/22* (2013.01); *H04L 45/126* (2013.01);
(Continued)

(58) Field of Classification Search
CPC . H04W 8/005; H04W 16/18; H04W 52/0206; H04W 74/02; H04W 74/0816;
(Continued)

(56) References Cited

U.S. PATENT DOCUMENTS 4,707,829 A * 11/1987 Pendse .................. H04L 12/433
340/2.7
6,907,044 B1 6/2005 Yonge, III et al.
(Continued)

FOREIGN PATENT DOCUMENTS

CN 105553574 5/2016

OTHER PUBLICATIONS

"Persistent and Nonpersistent CSMA", Tanenbaum, Computer Networks, Prentice-Hall Publishing Co., 1981, pp. 289-291. (Year: 1981).*

(Continued)

*Primary Examiner* — Phirin Sam
*Assistant Examiner* — Louis Samara
(74) *Attorney, Agent, or Firm* — Weiss & Moy, P.C.; Jeffrey D. Moy

(57) ABSTRACT

A method for interference avoidance when transmitting a message in a wireless system comprising: dividing a frame into a plurality of time slots, wherein a first plurality of time slots allocated as Time Division Multiple Access (TDMA) time slots and a second plurality of time slots allocated as contention slots; transmitting a message in a designated TDMA time slot by a corresponding wireless node assigned to the designated TDMA time slot if the designated TDMA time slot is idle; and transmitting the message in a contention slot if the designated TDMA time slot is busy.

20 Claims, 6 Drawing Sheets

(51) Int. Cl.
*G01S 5/22* (2006.01)
*H04W 56/00* (2009.01)
*H04L 12/733* (2013.01)
*H04W 16/18* (2009.01)
*H04W 52/02* (2009.01)
*H04W 72/04* (2009.01)
*H04W 84/18* (2009.01)

(52) U.S. Cl.
CPC ........... *H04W 8/005* (2013.01); *H04W 16/18* (2013.01); *H04W 52/0206* (2013.01); *H04W 56/002* (2013.01); *H04W 64/00* (2013.01); *H04W 74/02* (2013.01); *H04W 74/0816* (2013.01); *H04W 88/184* (2013.01); *H04W 72/0446* (2013.01); *H04W 84/18* (2013.01)

(58) Field of Classification Search
CPC . H04W 72/0446; H04W 74/04; H04W 36/20; H04W 74/0833; H04L 12/66; H04L 12/433
See application file for complete search history.

(56) References Cited

U.S. PATENT DOCUMENTS

| | | |
|---|---|---|
| 2003/0058886 A1 | 3/2003 | Stanforth et al. |
| 2003/0179707 A1 | 9/2003 | Bare |
| 2005/0201340 A1 | 9/2005 | Wang et al. |
| 2008/0013564 A1* | 1/2008 | Koski ............... H04W 74/0833 370/445 |
| 2008/0112371 A1* | 5/2008 | Joshi .................... H04W 74/02 370/337 |
| 2009/0129353 A1* | 5/2009 | Ki ..................... H04W 74/0816 370/338 |
| 2010/0027558 A1 | 2/2010 | Han et al. |
| 2010/0309872 A1 | 12/2010 | Amini et al. |
| 2013/0308451 A1 | 11/2013 | Townend et al. |
| 2014/0044126 A1 | 2/2014 | Sabhanatarajan et al. |
| 2014/0369339 A1* | 12/2014 | Nekoui ................ H04W 74/04 370/348 |
| 2016/0029398 A1 | 1/2016 | Palanki et al. |
| 2016/0073270 A1* | 3/2016 | Kobayashi ............ H04W 36/20 455/452.1 |
| 2016/0183280 A1 | 6/2016 | Chow et al. |

OTHER PUBLICATIONS

Dynamic duty cycle and adaptive contention window based QoS-MAC protocol for wireless multimedia sensor networks—ScienceDirect https://www.sciencedirect.com/science/article/abs/pii/S1389128608001849.

* cited by examiner

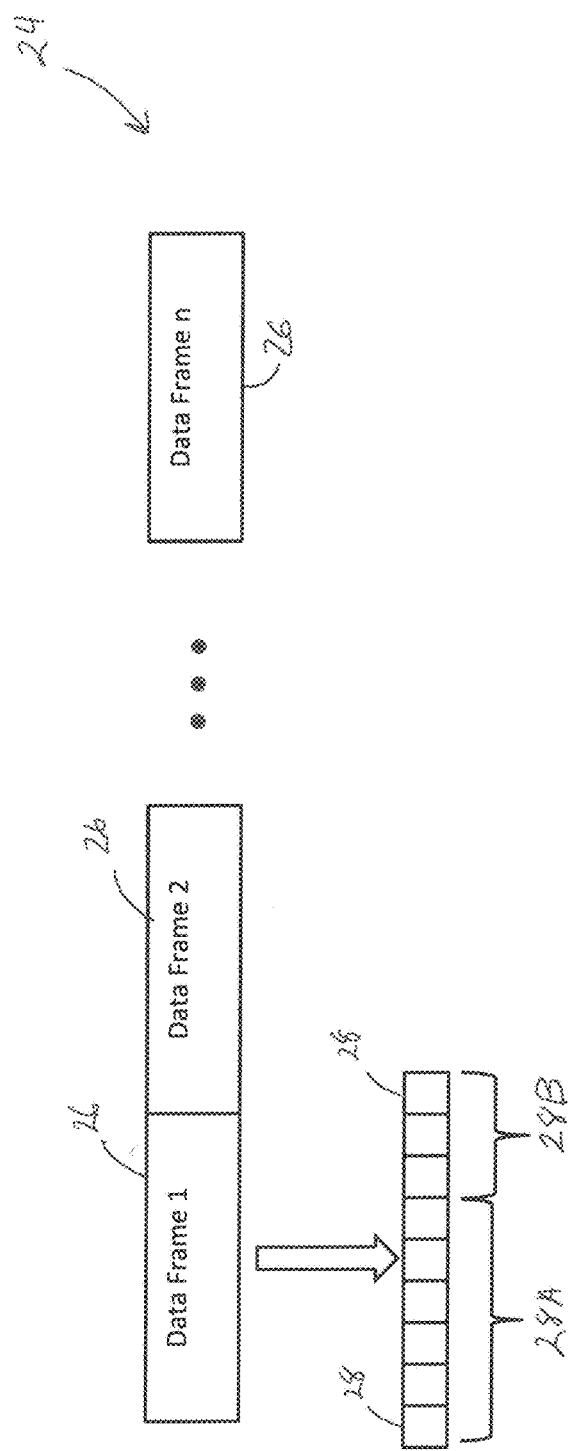

HYBRID TIME DIVISION MULTIPLE ACCESS (TDMA) AND CARRIER SENSE MULTIPLE ACCESS (CSMA) FOR INTERFERENCE AVOIDANCE METHOD THEREFOR

RELATED APPLICATIONS

This patent application is related to U.S. Provisional Application No. 62/577,566 filed Oct. 26, 2017, entitled "INTERNET OF THINGS (IOT) ARCHITECTURE" in the name of Hiep Truong, Kevin Nguyen, Ron Hobbs, and Jim Luecke, and which is incorporated herein by reference in its entirety. The present patent application claims the benefit under 35 U.S.C § 119(e).

TECHNICAL FIELD

The present application relates generally to the technical field of wireless networks, and more specifically, to the technical field of a hybrid Time Division Multiple Access (TDMA) and Carrier Sense Multiple Access (CSMA) system for interference avoidance in communication channels.

BACKGROUND

An ad hoc wireless network may be defined as a network that may be composed of individual devices wireless communicating with each other directly. These types of networks may bypass a central access point such as a router. Ad hoc wireless networks may eliminate the complexities of infrastructure setup and administration, enabling wireless devices to create and join networks on-the-fly-anywhere-anytime, for virtually any application. Ad hoc wireless networks may exist without any existing stationary infrastructure.

In an ad hoc network the individual devices are generally called nodes. The nodes may wirelessly communicate with one another. The nodes can communicate with each other over a wireless media without the support of an infrastructure-based or wired network. When the nodes are stationary and/or quasi-stationary, the nodes may communicate over a plurality of independent time/frequency channels. Different wireless protocols may be used to control the communications and to limit multiple nodes from transmitting data on the same channel.

Because of the mobile nature of the nodes, the links or connections between these nodes can change dynamically in an arbitrary manner. For example, existing nodes may move within the ad hoc network, new nodes may join or enter the ad hoc network, or existing nodes may leave or exit the ad hoc network. Because of the mobility of the nodes, multiple nodes may transmit on the same channel and or the same time slot of the same channel thereby causing interference.

Therefore, it would be desirable to provide a system and method that overcomes the above. It is desirable to develop a hybrid Time Division Multiple Access (TDMA) and Carrier Sense Multiple Access (CSMA) system for transmission interference avoidance.

SUMMARY

In accordance with one embodiment, a method for interference avoidance when transmitting a message in a wireless system is disclosed. The method comprises: dividing a frame into a plurality of time slots, wherein a first plurality of time slots allocated as Time Division Multiple Access (TDMA) time slots and a second plurality of time slots allocated as contention slots; transmitting a message in a designated TDMA time slot by a corresponding wireless node assigned to the designated TDMA time slot if the designated TDMA time slot is idle; and transmitting the message in a contention slot if the designated TDMA time slot is busy.

In accordance with one embodiment, a method for interference avoidance when transmitting a message in a wireless system is disclosed. The method comprises: dividing a frame into a plurality of time slots, wherein a first plurality of time slots allocated as Time Division Multiple Access (TDMA) time slots and a second plurality of time slots allocated as contention slots; verifying the designated TDMA time slot is idle; transmitting a message in a designated TDMA time slot by a corresponding wireless node assigned to the designated TDMA time slot if the designated TDMA time slot is idle; waiting for a predetermined timeframe if the designated TDMA time slot is busy; transmitting the message in a designated TDMA time slot by the corresponding wireless node if the designated TDMA time slot is idle after waiting for the predetermined timeframe; finding an idle contention slot if the designated TDMA time slot is busy; and transmitting the message in the idle contention slot if the designated TDMA time slot is busy.

In accordance with one embodiment, a method for interference avoidance when transmitting a message in a wireless system is disclosed. The method comprises: dividing a frame into a plurality of time slots, wherein a first plurality of time slots allocated as Time Division Multiple Access (TDMA) time slots and a second plurality of time slots allocated as contention slots; verifying the designated TDMA time slot is idle by carrier sensing; transmitting a message in a designated TDMA time slot by a corresponding wireless node assigned to the designated TDMA time slot if the designated TDMA time slot is idle; waiting for a predetermined timeframe if the designated TDMA time slot is busy; transmitting the message in a designated TDMA time slot by the corresponding wireless node if the designated TDMA time slot is idle after waiting for the predetermined timeframe; finding an idle contention slot if the designated TDMA time slot is busy; transmitting the message in the idle contention slot if the designated TDMA time slot is busy; relabeling the idle contention slot as the designated TDMA time slot for the corresponding wireless node; relabeling the designated TDMA time slot as the idle contention slot; updating a TDMA slot-table of the corresponding wireless node; and sending a message with the TDMA slot-table updated to another wireless node.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

FIG. 3 is an exemplary network data frame and slot structure diagram for the wireless network of FIG. 1 in accordance with one aspect of the present application;

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to a system and method wherein wireless nodes communicate through a hybrid Time Division Multiple Access (TDMA) and Carrier Sense Multiple Access (CSMA) method for transmission interference avoidance. The system and method may use a TDMA structure wherein a frame may be divided into a plurality of slots. The slots may be separated into (1) assigned slots and (2) contentions slots. Channel access may be through (1) assigned TDMA slots and (2) slotted CSMA as explained below.

Figure 1:
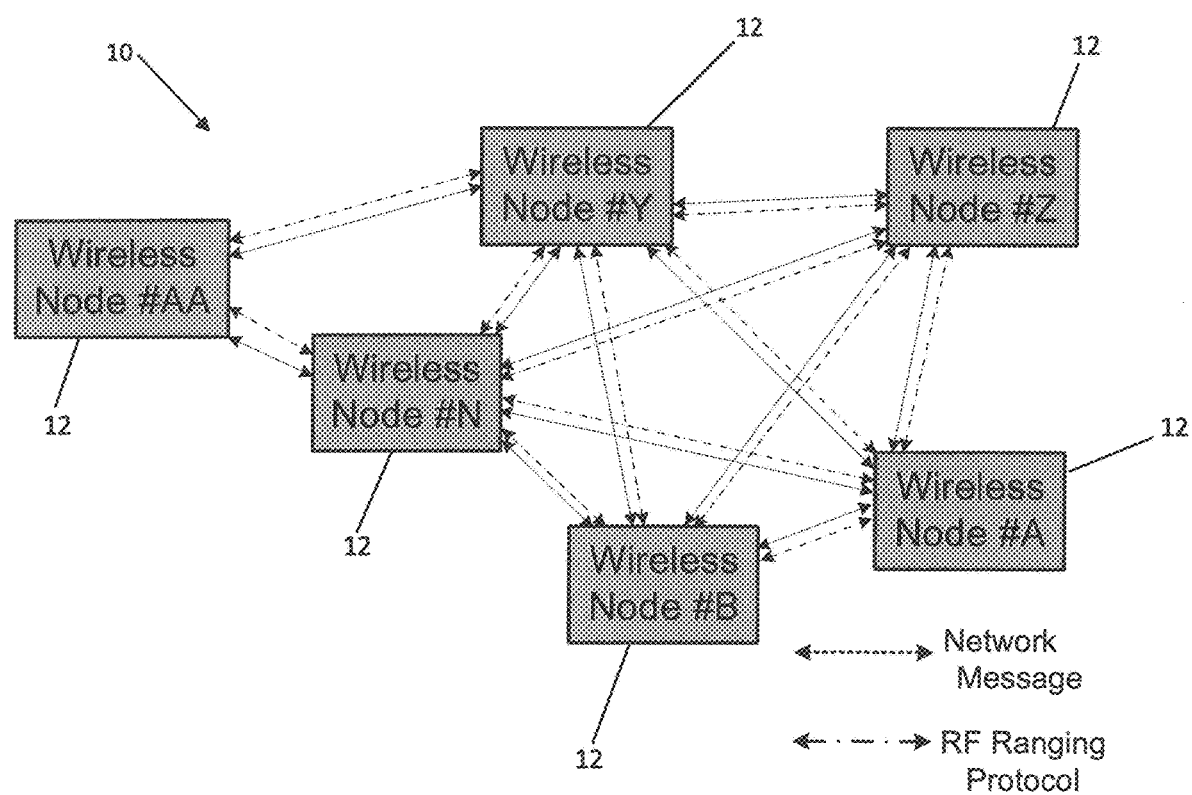
FIG. 1 is an exemplary block diagram depicting a wireless network in accordance with one aspect of the present application.

Referring to FIG. 1, a wireless network 10 may be seen. The wireless network 10 is a dynamic type of network have a plurality of wireless nodes 12. Wireless nodes 12 may be added to, removed or moved from one location to another within the wireless network 10 without notice. The wireless network 10 may be designed such that disjoined groups of wireless nodes 12 may merge together when they are nearby or come close to within communication range of each other to form the wireless network 10. By the same token, a group of wireless nodes 12 may split into smaller groups as wireless nodes 12 are moving away from each other.

Once timing has been established, the wireless nodes 12 may be able to wirelessly communicate with each other directly. The wireless nodes 12 cooperatively form the wireless network 10 independently of any fixed base station and/or hub infrastructure. Each wireless node 12 communicates directly with other wireless nodes 12 within wireless range and indirectly with other wireless nodes 12 not in wireless range by relying on other wireless nodes 12 within wireless range to forward traffic on its behalf. The wireless nodes 12 may be any type of electronic device that is capable of creating, receiving, or transmitting information over a communications channel.

As may be seen in FIG. 1, the wireless nodes 12 may be shown as wireless nodes #A-#N, Wireless Nodes #Y-#Z and wireless node #AA. Each of the wireless nodes #A-#N and #Y-#Z may be able to wirelessly communicate with each other directly as shown by the signal lines. While wireless nodes #A, #B and #Z are not directly connected to wireless node #AA, wireless nodes #A, #B, and #Z may still communicate with wireless node #AA by sending communication signals through wireless nodes #N or #Y. Node to node ranging may be used to determined the most direct route for communicating between wireless nodes 12 not in wireless range of each other.

Figure 2:
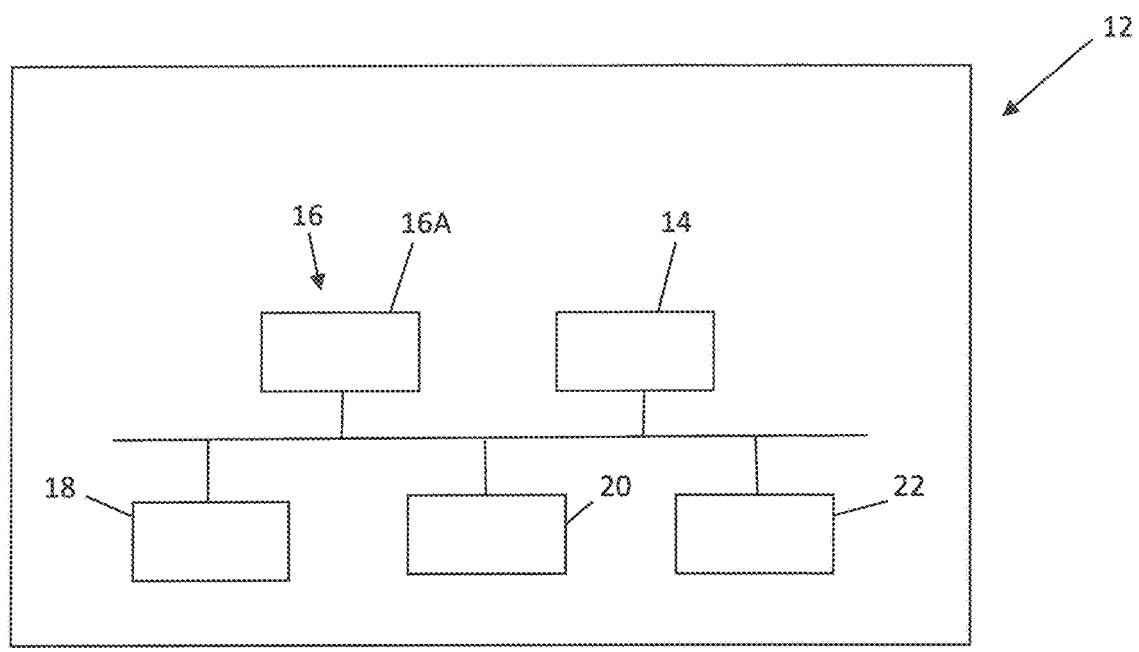
FIG. 2 is an exemplary block diagram of a wireless node used in the wireless network of FIG. 1 in accordance with one aspect of the present application.
Figure 4A:
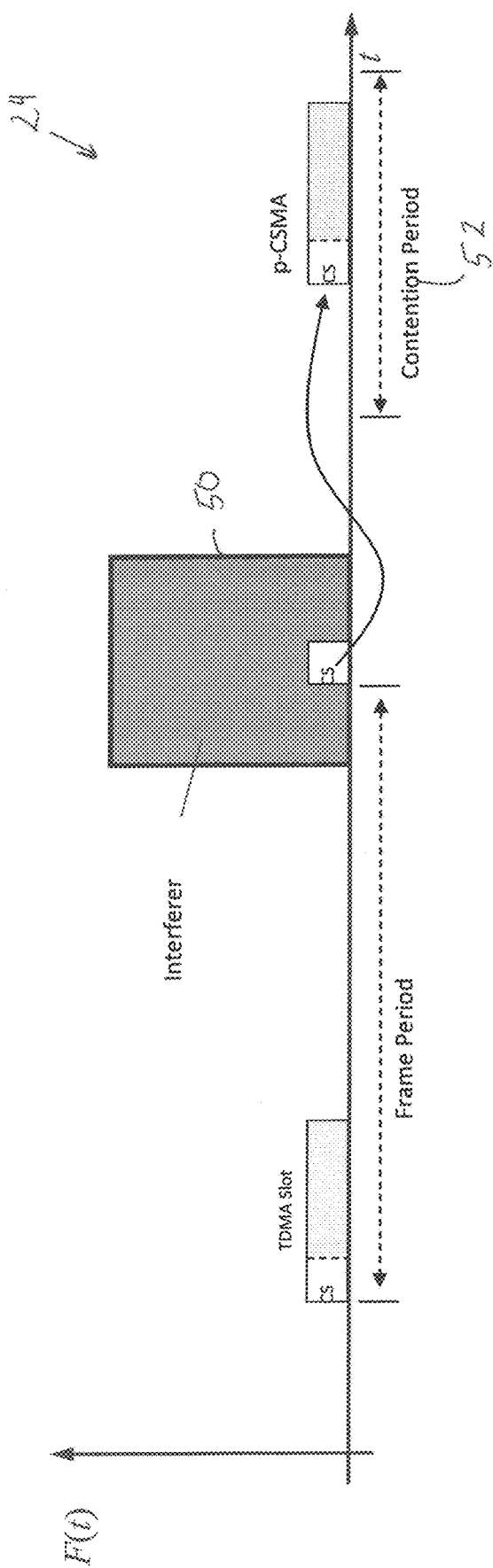
FIG. 4A is an exemplary timing diagram showing network messaging and slot structure for the wireless network of FIG. 1 in accordance with one aspect of the present application.
Figure 4B:
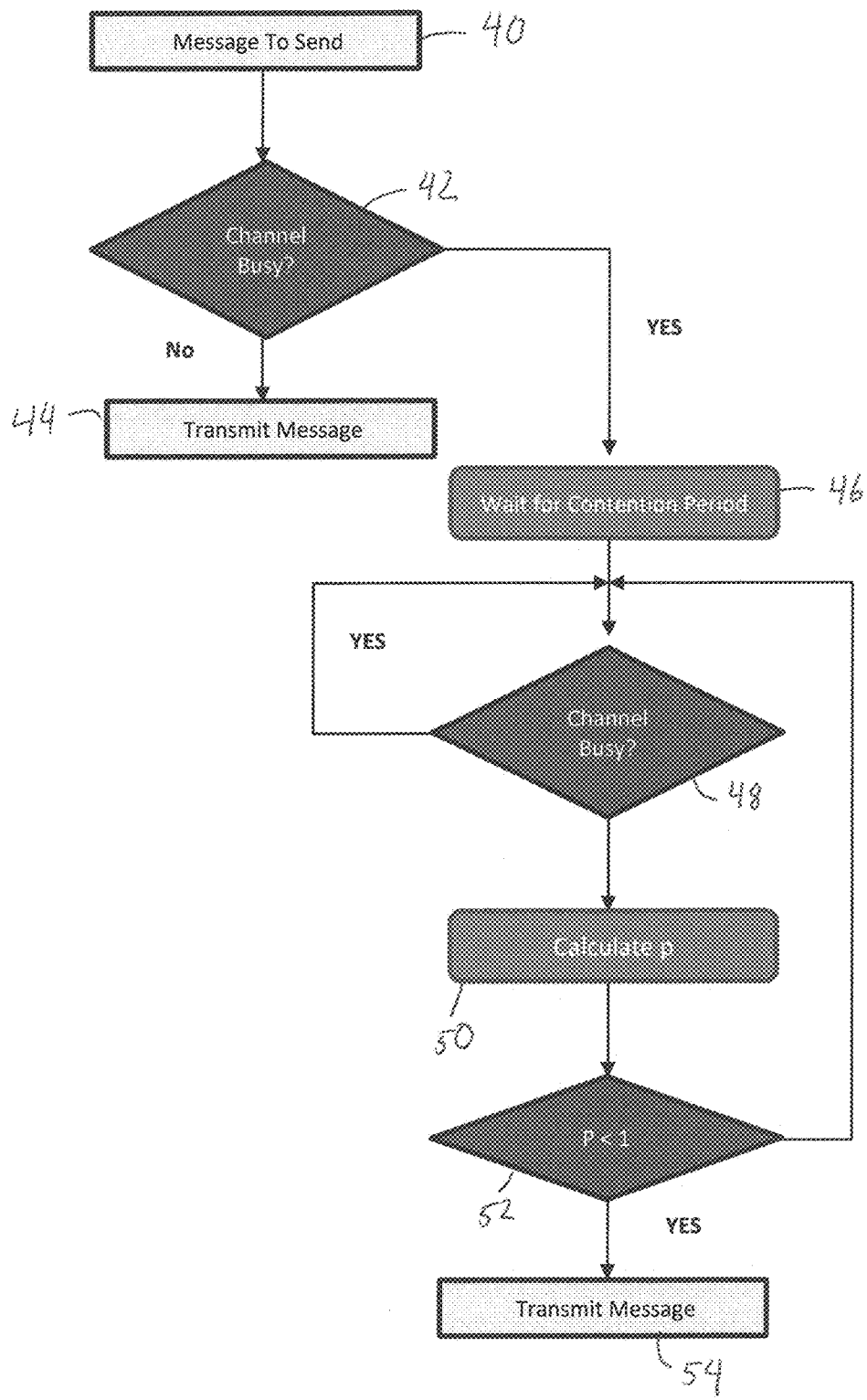
FIG. 4B is an exemplary flowchart showing network messaging for the wireless network of FIG. 1 in accordance with one aspect of the present application.

Referring to FIG. 2, a block diagram of one embodiment of a wireless node 12 may be seen. The wireless node 12 may have a sensor 14. The sensor 14 may be used to collect sensory data. For example, the sensor 14 may be used to collect noise data, vibration data, pollutant data, and/or other external sensory data.

The wireless node 12 may have a receiver/transmitter 16. The receiver/transmitter 16 may be used to send and receive data to and from the wireless node 12. In accordance with one embodiment, the receiver/transmitter 16 may be an Ultra-Wideband (UWB) receiver/transmitter 16A. The UWB receiver/transmitter 16A may operate in the unlicensed frequency bands of 3 GHz to 6 GHz.

The wireless node 12 may have memory 18. The memory 18 may be used to store sensory data from the sensor 14. In some embodiments, sensory data could be transmitted elsewhere for storage via the receiver/transmitter 16. The memory 18 may also be used as a computer-readable storage medium containing instructions for executing a dynamic slot structure for communication between the wireless nodes 12 as will be described below. Such instructions can be executed by a processor 20. The wireless node 12 may be powered by a power source 22. The power source 22 may be a battery or similar device.

In the wireless network 10, multiple data sessions may be in progress simultaneously and can share a single communication channel. Such multiple data sessions can be addressed to multiple destinations. Thus, the wireless network 10 should be designed to achieve collision-free transmissions of data frames within time-slots of a single communication channel.

Once the wireless ad hoc network 10 has been established, the wireless ad hoc network 10 may communicate over one or more communications links/channels (hereinafter channel). The channel 24 may use a network data frame structure as may be seen in FIG. 3 for communication between wireless node 12. The channel 24 may have a plurality of data frames 26 labeled as Data Frame 1, Data Frame 2, . . . Data Frame n. Each data frame 26 may be divided into a plurality of slots 28. The slots may be divided into assigned TDMA slots 28A and contention slots 28B. Each TDMA slot 28A may be assigned to a particular wireless node 12. The wireless node 12 assigned to a particular TDMA slot 28A may transmit data in that particular TDMA slot 28A. The contention slots 28B may be used to transmit data for a particular wireless node 12 if the TDMA slot 28A assigned to that particular wireless node is busy. The network slots 28 may be configured to have a dynamic network slot structure wherein TDMA slots 28A may change to contention slots 28B and contention slots 28B may change to TDMA slots 28A as will be described below.

The contention slots 28B may be used to transmit data for a particular wireless node 12 if the TDMA slot 28A assigned to that particular wireless node is busy. Thus, the contention slots 28B may mimic CSMA. CSMA may be used as a multiple access technique that allows multiple users to share a common channel. While CSMA can be used in this normal sense, the protocol has been adapted in the present invention to support interference avoidance.

Interference in this sense includes co-channel interference created by other wireless nodes 12 of the wireless network 10. In general, CSMA is a technique that checks to see if the channel is busy before transmission. If busy, the protocol waits either for the channel to become free (1-CSMA) or for a random period of time (non-persistent CSMA). So-called P-persistent CSMA is a compromise between these two positions. P-persistent controls the likelihood of collision. If the channel is busy, then it senses the channel continuously until it becomes idle, then transmits with probability p. If the wireless node does not transmit (the probability of this event is 1−p), it waits until the next available time slot. If the channel is not busy, it transmits again with the same probability p. This probabilistic hold-off repeats until the message is finally transmitted or when the channel is found to become busy again (i.e. some other wireless node has already started transmitting). In the latter case the wireless node repeats the whole logic cycle (which started with sensing the channel for idle or busy) again.

Referring now to FIG. 1-5B, a method of transmitting a message by a wireless node 12 in the wireless system 10 may be disclosed. When a wireless node 12 wants to transmit a message as shown in 40, the wireless node 12 may verify that the channel is idle via carrier sensing as shown in 42. Since the wireless node 12 is operating TDMA, the verification of the channel 24 being idle may ensure there are no interferers 50 to contend with. If the channel 24 is idle, the wireless node 12 may transmit the message in the assigned TDMA slot 28A as shown in 44. If the channel is busy, the wireless node 12 may wait until the completion of a contention period 52 as shown in 46. At the completion of the contention period 52, the wireless node 12 checks again to see if the channel 24 is busy as shown in 48. If the channel 24 is busy, the wireless node 12 may operate under p-persistent CSMA.

In p-persistent CSMA, if the channel is busy, the wireless node 12 continuously senses the channel 24 until it becomes idle as shown in 48 and then transmits with probability $P_A$ where $P_A$ may be defined as:

$$P_A = \left(1 - \frac{1}{N}\right)^{N-1}$$

where N is the number of wireless nodes 12 that are connected to the shared channel 24.

The value of $P_A$ may be calculated using the above equation as shown in 50. A determination is made if the value of $P_A$ is less than 1 as shown in 52. If the value of $P_A$ is less than 1, the wireless node 12 may transmit the message as shown in 54. If the value of $P_A$ is not less than 1, the wireless node 12 does not transmit and waits until the channel 24 is idle. If the channel 24 is idle, the wireless node 12 may transmits again with the same probability $P_A$. This probabilistic hold-off repeats until the message is finally transmitted.

However, if interference continues, the wireless node 12 may establish a new TDMA slot 28A. Since slots are assigned (TDMA), if an interference condition arises, the wireless node 12 it may remain quasi-stationary state with the wireless node 12 forced into a 'virtual' contention mode. Thus, the wireless node 12 must wait it out and suffer a loss in performance, or the wireless node 12 may change TDMA slots 28A. Each wireless node 12 may maintains a table of assigned TDMA slot(s) 28A and the available contention slots 28B. If the assigned TDMA slot 28A of the wireless node 12 is repeatedly busy, the wireless node 12 may find an idle contention slot 28B. For example, during the contention period 52, the wireless node 12 may check to see if any of the allocated contentions slots 28B are free (idle). If the wireless node 12 finds a contention slot 28B that is free (idle), the wireless node 12 may declare rights to the contention slot 28B redefining the contention slot 28B as the assigned TDMA slot 28A. The old TDMA slot 28A would simultaneously be redefined as a contention slot 28B.

Figure 5A:
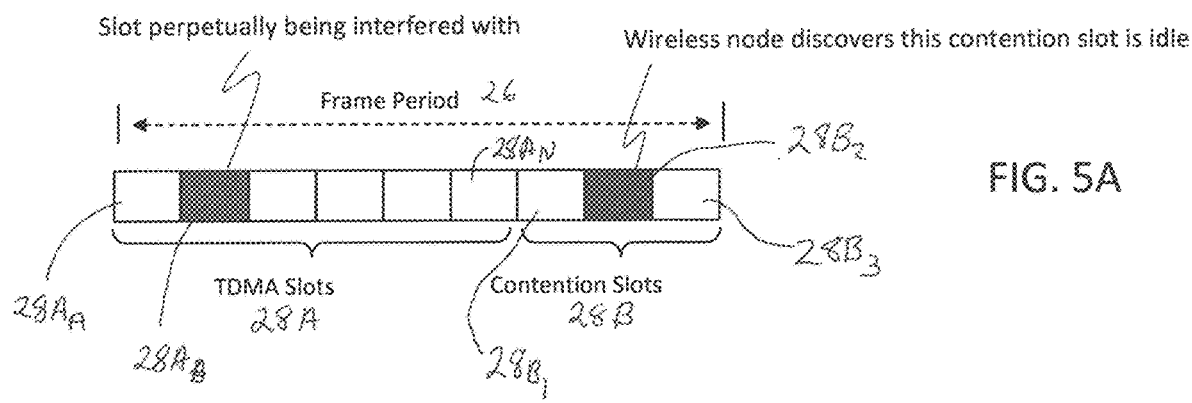
FIGS. 5A-5B are exemplary slot structure diagrams used in the wireless network of FIG. 1 in accordance with one aspect of the present application.

Thus, as shown in FIG. 5A, the data frame 26 may be divided into a plurality of slots 28. The slots may be divided into assigned TDMA slots 28A and contention slots 28B. Each TDMA slot 28A may be assigned to a particular wireless node 12. Using the wireless network of FIG. 1, TDMA slot $28A_A$ may be assigned to wireless node A, TDMA slot $28A_B$ may be assigned to wireless node B, . . . and TDMA slot $28A_N$ may be assigned to wireless node N. The contention slots 28B may be labeled as contention slots $28B_1$, contention slots $28B_2$, and contention slots $28B_3$.

The wireless node 12 may declare rights to the contention slot 28A redefining the contention slot 28B as the assigned TDMA slot 28A. The old TDMA slot 28A would simultaneously be redefined as a contention slot 28B. The changes to the labels of the different slots 28 may be updated in the TDMA slot-table of the corresponding wireless node 12 and broadcast to all of the other wireless nodes 12. In accordance with one embodiment, the corresponding wireless node 12 may send a message with the updated TDMA slot-table to another wireless node 12 identified as the cluster head. The cluster head may then transmit the updated TDMA slot-table to all wireless nodes 12 within the grid/cluster. The cluster head may ensure that the TDMA slot-table remain synchronized.

Figure 5B:
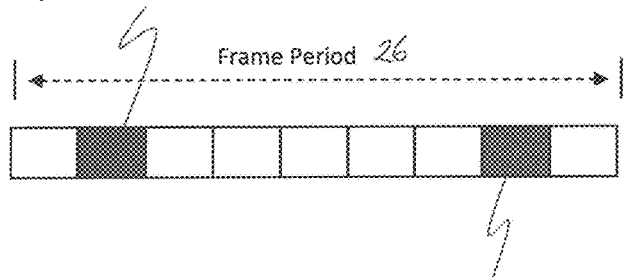

As an example of the above, if wireless node B wants to transmits a message, the wireless node B needs to transmit the message in TDMA slot $28A_B$. If TDMA slot $28A_B$ is continuously busy, the wireless node B needs to find an idle contention slot 28B. In this embodiment, contention slot $28B_2$ is idle. The wireless node B may declare rights to the contention slot $28B_2$ redefining the contention slot $28B_2$ as the assigned TDMA slot $28A_B$. The old TDMA slot $28A_B$ would simultaneously be redefined as a contention slot $28B_2$ as shown in FIG. 5B.

The foregoing description is illustrative of particular embodiments of the application, but is not meant to be a limitation upon the practice thereof. The following claims, including all equivalents thereof, are intended to define the scope of the application.

What is claimed is:

1. A method for interference avoidance when transmitting a message in a wireless system comprising:
   dividing a frame into a plurality of time slots, wherein a first plurality of time slots allocated as Time Division Multiple Access (TDMA) time slots and a second plurality of time slots allocated as contention slots;
   transmitting the message in a designated TDMA time slot by a corresponding wireless node assigned to the designated TDMA time slot if the designated TDMA time slot is idle;
   relabeling a contention slot as the designated TDMA time slot for the corresponding wireless node when the designated TDMA time slot for the corresponding wireless node remains busy;
   relabeling the designated TDMA time slot as the contention slot; and
   transmitting the message in the contention slot relabeled as the designated TDMA time slot for the corresponding wireless node.

2. The method of claim 1, comprising relabeling simultaneously the contention slot as the designated TDMA time slot for the corresponding wireless node when the designated TDMA time slot for the corresponding wireless node remains busy during a contention period and the designated TDMA time slot as the contention slot.

3. The method of claim 1, comprising verifying the designated TDMA time slot is idle.

4. The method of claim 1, comprising verifying the designated TDMA time slot is idle by carrier sensing.

5. The method of claim 1, comprising:
waiting for a predetermined timeframe if the designated TDMA time slot is busy; and
transmitting the message in a designated TDMA time slot by the corresponding wireless node if the designated TDMA time slot is idle after waiting for the predetermined timeframe.

6. The method of claim 5, comprising operating under p-persistent CSMA if the designated TDMA time slot is busy after waiting for the predetermined timeframe.

7. The method of claim 6, wherein under p-persistent CSMA if the designated TDMA time slot is busy after waiting for the predetermined timeframe comprises:
continuously checking the designated TDMA time slot to see if the designated TDMA time slot is busy;
calculating a probability $P_A$, wherein $$P_A = \left(1 - \frac{1}{N}\right)^{N-1}$$

and N is the number of wireless nodes connected to a shared channel;
transmitting the message in the designated TDMA time slot if the value of $P_A$ is less than 1; and
waiting until the designated TDMA time slot is idle if the value of $P_A$ is more than 1.

8. The method of claim 1, comprising:
finding an idle contention slot if the designated TDMA time slot is busy;
transmitting the message in the idle contention slot if the designated TDMA time slot is busy.

9. The method of claim 1, comprising updating a TDMA slot-table of the corresponding wireless node.

10. The method of claim 9, comprising sending a message with the TDMA slot-table updated to another wireless node.

11. A method for interference avoidance when transmitting a message in a wireless system comprising:
dividing a frame into a plurality of time slots, wherein a first plurality of time slots allocated as Time Division Multiple Access (TDMA) time slots and a second plurality of time slots allocated as contention slots;
verifying the designated TDMA time slot is idle;
transmitting the message in a designated TDMA time slot by a corresponding wireless node assigned to the designated TDMA time slot if the designated TDMA time slot is idle;
waiting for a predetermined timeframe if the designated TDMA time slot is busy;
transmitting the message in a designated TDMA time slot by the corresponding wireless node if the designated TDMA time slot is idle after waiting for the predetermined timeframe;
finding an idle contention slot if the designated TDMA time slot is busy;
relabeling the idle contention slot as the designated TDMA time slot for the corresponding wireless node when the designated TDMA time slot for the corresponding wireless node remains busy;
relabeling the designated TDMA time slot as the idle contention slot; and
transmitting the message in the idle contention slot relabeled as the designated TDMA time slot for the corresponding wireless node.

12. The method of claim 11, comprising:
relabeling simultaneously the idle contention slot as the designated TDMA time slot for the corresponding wireless node and the designated TDMA time slot as the idle contention slot during a contention period.

13. The method of claim 12, comprising updating a TDMA slot-table of the corresponding wireless node.

14. The method of claim 13, comprising sending a message with the TDMA slot-table updated to another wireless node.

15. The method of claim 11, comprising verifying the designated TDMA time slot is idle by carrier sensing.

16. The method of claim 11, comprising operating under p-persistent CSMA if the designated TDMA time slot is busy after waiting for the predetermined timeframe.

17. The method of claim 16, wherein under p-persistent CSMA if the designated TDMA time slot is busy after waiting for the predetermined timeframe comprises:
continuously checking the designated TDMA time slot to see if the designated TDMA time slot is busy;
calculating a probability $P_A$, wherein $$P_A = \left(1 - \frac{1}{N}\right)^{N-1}$$

and N is the number of wireless nodes connected to a shared channel;
transmitting the message in the designated TDMA time slot if the value of $P_A$ is less than 1; and
waiting until the designated TDMA time slot is idle if the value of $P_A$ is more than 1.

18. A method for interference avoidance when transmitting a message in a wireless system comprising:
dividing a frame into a plurality of time slots, wherein a first plurality of time slots allocated as Time Division Multiple Access (TDMA) time slots and a second plurality of time slots allocated as contention slots;
verifying the designated TDMA time slot is idle by carrier sensing;
transmitting the message in a designated TDMA time slot by a corresponding wireless node assigned to the designated TDMA time slot if the designated TDMA time slot is idle;
waiting for a predetermined timeframe if the designated TDMA time slot is busy;
transmitting the message in a designated TDMA time slot by the corresponding wireless node if the designated TDMA time slot is idle after waiting for the predetermined timeframe;
finding an idle contention slot if the designated TDMA time slot is busy;
relabeling the idle contention slot as the designated TDMA time slot for the corresponding wireless node when the designated TDMA time slot for the corresponding wireless node remains busy;
relabeling the designated TDMA time slot as the idle contention slot;
transmitting the message in the idle contention slot relabeled as the designated TDMA time slot for the corresponding wireless node if the designated TDMA time slot is busy;

updating a TDMA slot-table of the corresponding wireless node; and sending a message with the TDMA slot-table updated to another wireless node.

19. The method of claim 18, comprising operating under p-persistent CSMA if the designated TDMA time slot is busy after waiting for the predetermined timeframe.

20. The method of claim 19, wherein under p-persistent CSMA if the designated TDMA time slot is busy after waiting for the predetermined timeframe comprises:

continuously checking the designated TDMA time slot to see if the designated TDMA time slot is busy;

calculating a probability $P_A$, wherein $$P_A = \left(1 - \frac{1}{N}\right)^{N-1}$$

and N is the number of wireless nodes connected to a shared channel;

transmitting the message in the designated TDMA time slot if the value of $P_A$ is less than 1; and waiting until the designated TDMA time slot is idle if the value of $P_A$ is more than 1.

* * * * *